(12) United States Patent
Bonnaudet et al.

(10) Patent No.: US 7,511,821 B2
(45) Date of Patent: Mar. 31, 2009

(54) DEVICE FOR IMPROVING THE LIFE OF A TRIAXIAL GYRO

(75) Inventors: Etienne Bonnaudet, St Georges les Baillargeaux (FR); Pierre Gallon, Vouneuil sur Vienne (FR); Selvin David, Chatellerault (FR)

(73) Assignee: Thales (FR)

( * ) Notice: Subject to any disclaimer, the term of this patent is extended or adjusted under 35 U.S.C. 154(b) by 46 days.

(21) Appl. No.: 11/766,968

(22) Filed: Jun. 22, 2007

(65) Prior Publication Data
US 2008/0002208 A1 Jan. 3, 2008

(30) Foreign Application Priority Data
Jun. 23, 2006 (FR) .................................. 06 05666

(51) Int. Cl.
*G01C 19/66* (2006.01)
*H01S 3/083* (2006.01)
(52) U.S. Cl. ..................... 356/471; 356/469; 372/94
(58) Field of Classification Search ................ 356/455, 356/469, 471; 372/94
See application file for complete search history.

(56) References Cited

U.S. PATENT DOCUMENTS

| | | | | | |
|---|---|---|---|---|---|
| 3,503,688 | A | * | 3/1970 | Lechevalier | 356/471 |
| 4,407,583 | A | * | 10/1983 | Simms | 356/471 |
| 4,477,188 | A | * | 10/1984 | Stiles et al. | 356/471 |
| 4,762,415 | A | * | 8/1988 | Geen et al. | 356/471 |
| 4,795,258 | A | * | 1/1989 | Martin | 356/471 |
| 4,837,774 | A | * | 6/1989 | Jabr et al. | 372/94 |
| 4,839,903 | A | * | 6/1989 | Simms et al. | 372/94 |
| 5,260,962 | A | * | 11/1993 | Hotaling | 372/94 |
| RE34,490 | E | * | 12/1993 | Bernelin et al. | 356/471 |
| 5,371,589 | A | * | 12/1994 | Martin | 356/471 |
| 5,371,591 | A | * | 12/1994 | Martin et al. | 356/471 |
| 5,394,241 | A | * | 2/1995 | Geen | 356/471 |
| 5,448,354 | A | * | 9/1995 | Schmars et al. | 356/471 |
| 5,940,179 | A | * | 8/1999 | Jaulain et al. | 356/471 |
| 6,002,535 | A | * | 12/1999 | Jaulain et al. | 359/830 |
| 6,069,699 | A | * | 5/2000 | Hemery et al. | 356/459 |

(Continued)

FOREIGN PATENT DOCUMENTS

FR        2542867        9/1984

(Continued)

*Primary Examiner*—Patrick J Connolly
(74) *Attorney, Agent, or Firm*—Lowe Hauptman Ham & Berner, LLP

(57) ABSTRACT

The present invention relates to a laser gyro of the type comprising an optical block comprising three communicating resonant optical cavities which form a regular octahedron having eight triangular sides, each of the cavities presenting four capillary segments forming a square perpendicular to a corresponding sensitive axis, these cavities being arranged so that each of the angles of one cavity coincides and communicates with the angle of another cavity, a mirror associated with each pair of coinciding angles being oriented so as to be used by the two cavities forming said pair, each cavity using four mirrors including a reading mirror and a cavity-length servo mirror, said gyro also comprising an activation mechanism for driving the block according to a reciprocating rotation movement about an activation axis, and it is characterized in that this gyro comprises three cathodes each linked to two cavities out of the three, these two cavities being each time taken by circular permutation.

4 Claims, 4 Drawing Sheets

U.S. PATENT DOCUMENTS

| | | |
|---|---|---|
| 6,668,648 B2 * | 12/2003 | Karasawa et al. ........ 73/504.08 |
| 6,688,174 B1 * | 2/2004 | Gallon et al. .................. 73/493 |
| 7,159,461 B2 * | 1/2007 | Gallon et al. ............ 73/504.12 |
| 2004/0202222 A1 | 10/2004 | Pocholle et al. |
| 2008/0002208 A1 * | 1/2008 | Bonnaudet et al. .......... 356/450 |

FOREIGN PATENT DOCUMENTS

| | | |
|---|---|---|
| FR | 2730561 | 8/1996 |
| FR | 2759160 | 8/1998 |

* cited by examiner

DEVICE FOR IMPROVING THE LIFE OF A TRIAXIAL GYRO

RELATED APPLICATIONS

The present application is based on, and claims priority from, France Application Number 0605666, filed Jun. 23, 2006, the disclosure of which is hereby incorporated by reference herein in its entirety.

FIELD OF THE INVENTION

The present invention relates to a device for improving the life of a triaxial gyro.

BACKGROUND OF THE INVENTION

As is known in the state of the art, one limitation to the life of a laser gyro is directly linked to the operating time of the cathode. This operating time is limited by the sputtering of the oxide layer deposited on the cathode. For one considered cathode geometry, the life is mainly dependent on the current density required of the cathode.

The main characteristics of a triaxial gyro will first be reviewed. The current configuration of such a gyro (FIG. 1) uses a system of plasma discharges which leaves from a single cathode (CA) and is then split by passing into three linking capillaries (C1 to C3) which arrive at the gas reserves, respectively referenced B, C, D. To simplify the drawing of FIGS. 1 to 4, the cathodes are not represented, but the start of the corresponding capillaries linking to these cathodes. From each gas reserve there then leave two plasma conduction capillaries which supply the anodes. To simplify the drawing, FIG. 2 shows only the case of the gas reserve for the mirror D, the configuration of the elements relating to the other gas reserves being the same as for D. This reserve is linked to the anodes A1 and A2 by the capillaries CD1 and CD2, respectively forming part of the cavities defined by the mirrors (A, D, B, F) and (F, C, D, E) and by the capillaries linking them. The cathode CA is therefore linked to the six anodes (A1 to A6). This architecture makes it possible to keep a symmetrical configuration which uses two anodes for each cavity.

A triaxial laser gyro of the prior art, as mentioned above, for example the PIXYZ® gyro, has the following characteristics:

Triaxial laser gyro comprising three laser cavities, orthogonal to each other in pairs (see FIGS. 1 and 2). The three cavities are incorporated in one and the same block of Zérodur® characterized by a very low thermal expansion.

The triaxial assembly comprises six mirrors (three transmission mirrors and three piezoelectric-mounted relocatable mirrors, hereinafter called "piezo mirrors"). Each mirror is common to two cavities.

The gain providing the laser effect is obtained by the electrical discharges into an He—Ne plasma between one cathode and several anodes (preferably six).

The optical block has associated with it an activation system placed on one of the "trisectrices" of the block (a trisectrix is defined as follows: if the six mirrors A to F were to be placed at the respective centers of the sides of a cube, each trisectrix would be an axis joining two opposite peaks of this cube). This mechanical system provides a way of overcoming the so-called "blind zone" effect.

If we consider more particularly a cavity, the cavity is enclosed by four mirrors. Two are used as "piezo mirrors" (mirrors with servo-controlled position), which makes it possible to adjust the cavity-length to an integer number of wavelengths. The other two are partially reflecting mirrors. One of these mirrors carries a reading system which, after the two beams CW and CCW (contrapropagative beams) from the laser cavity are recombined, makes it possible to obtain an interference pattern. If the cavity is rotating, this pattern passes in front of two photoelectric cells arranged in phase quadrature. The frequency seen by the cells depends on the angular speed of the optical block about the sensitive axis of the cavity. The phase between the two signals received by the cells depends on the direction of rotation of the cavity.

A diaphragm makes it possible to select the main mode $TEM_{00}$ of the laser and reject the higher modes. One diaphragm is used for each cavity.

As described in French patent 2 759 160, optimizing the performance characteristics of the gyro entails more particularly:

The use of two electrical discharges for each cavity. Each discharge is established between the common cathode and an anode. The two anodes are placed in the plane of the cavity. This symmetrical definition makes it possible to overcome the gas flow effects in the cavity (Fizeau effect).

The use of an activation, the sensitive axis of which is combined with the "Cathode" axis (axis 1 passing through the cathode CA in FIG. 1).

The placement of this activation axis vertically in the carrier to make the thermal dissipation of the block symmetrical.

The use of balancing capillaries between the anodes to reduce the gyro power-up effects (see French patent application 95 01645).

In a triaxial gyro as described above, the current required of the cathode is six times the operating current of the gyro. For an application requiring a very long life, this configuration is limited by the fact of the high current density required of the cathode, as specified above.

SUMMARY OF THE INVENTION

The subject of the present invention is a device for improving the life of a triaxial gyro in the simplest and most inexpensive way possible.

The gyro according to the invention is a laser gyro of the type comprising an optical block comprising three communicating resonant optical cavities which form a regular octahedron having eight triangular sides, each of the cavities presenting four capillary segments forming a square perpendicular to a corresponding sensitive axis, these cavities being arranged so that each of the angles of one cavity coincides and communicates with the angle of another cavity, a mirror associated with each pair of coinciding angles being oriented so as to be used by the two cavities forming said pair, each cavity using four mirrors of which two are transmissive, one of them being a reading mirror, and the other two being cavity-length servo mirrors, said gyro also comprising an activation mechanism for driving the block according to a reciprocating rotation movement about an activation axis, and it is characterized in that it comprises three cathodes each linked to two cavities out of the three, these two cavities being each time taken by circular permutation.

According to another characteristic of the invention, each cathode is linked to a gas reserve associated with a mirror, this reserve being in turn linked to two cavity capillary segments belonging to two different cavities.

BRIEF DESCRIPTION OF THE DRAWINGS

The present invention will be better understood from reading the detailed description of one embodiment, taken as a nonlimiting example and illustrated by the appended drawing, in which.

DETAILED DESCRIPTION OF THE INVENTION

Figure 1:
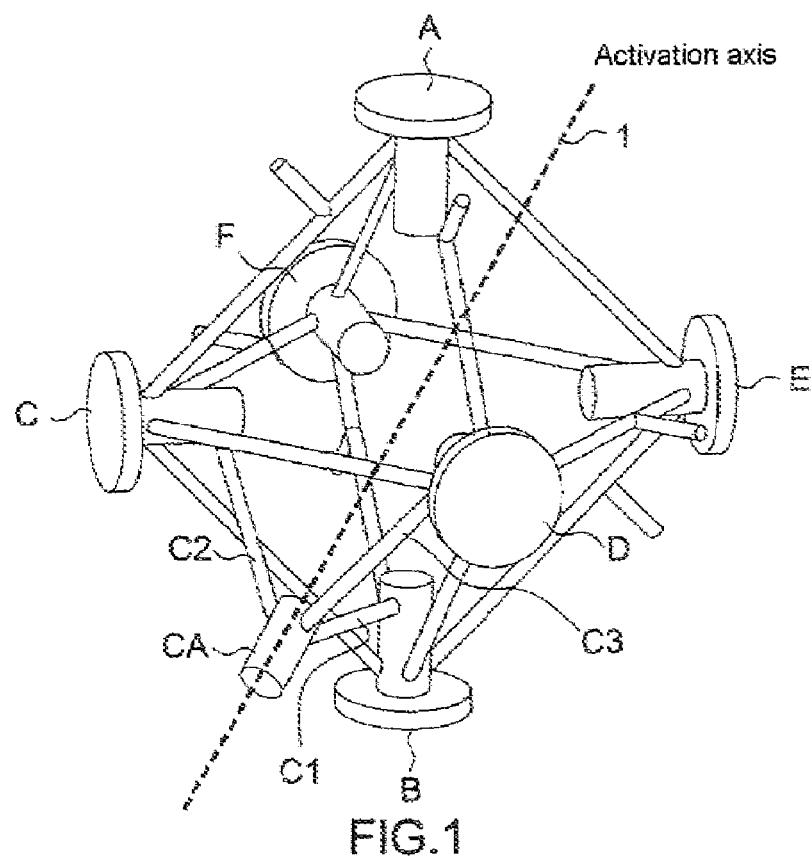
FIG. 1 is a perspective view of the optical block of a gyro of the prior art providing the starting point for the present invention.
Figure 2:
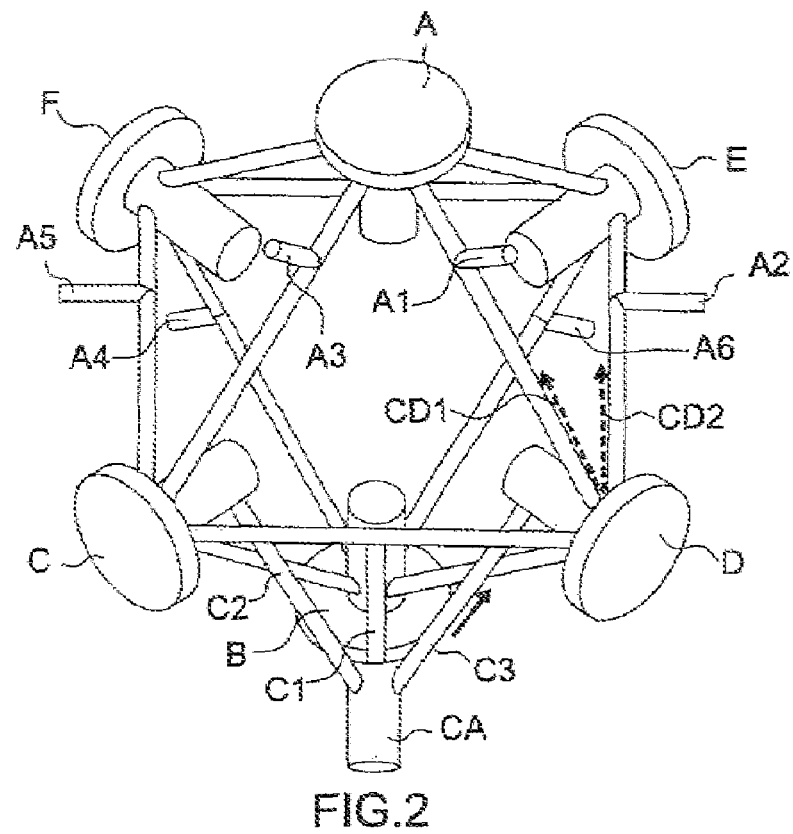
FIG. 2 is a perspective view of the optical block of the gyro of FIG. 1, seen from another angle and showing in more detail the gas reserve associated with one of the mirrors.

One of the main characteristics of the inventive gyro is that it comprises three cathodes, each supplying two anodes, in order to very significantly reduce the current density passing through each cathode. Consequently, this configuration entails modifying the current regulation and the ignition sequence of the gyro. The description below refers to the gyro of the prior art, as represented in FIGS. 1 and 2, for the parts that are common with those of the inventive gyro, and only the novel elements of the latter will be described in detail.

Figure 3:
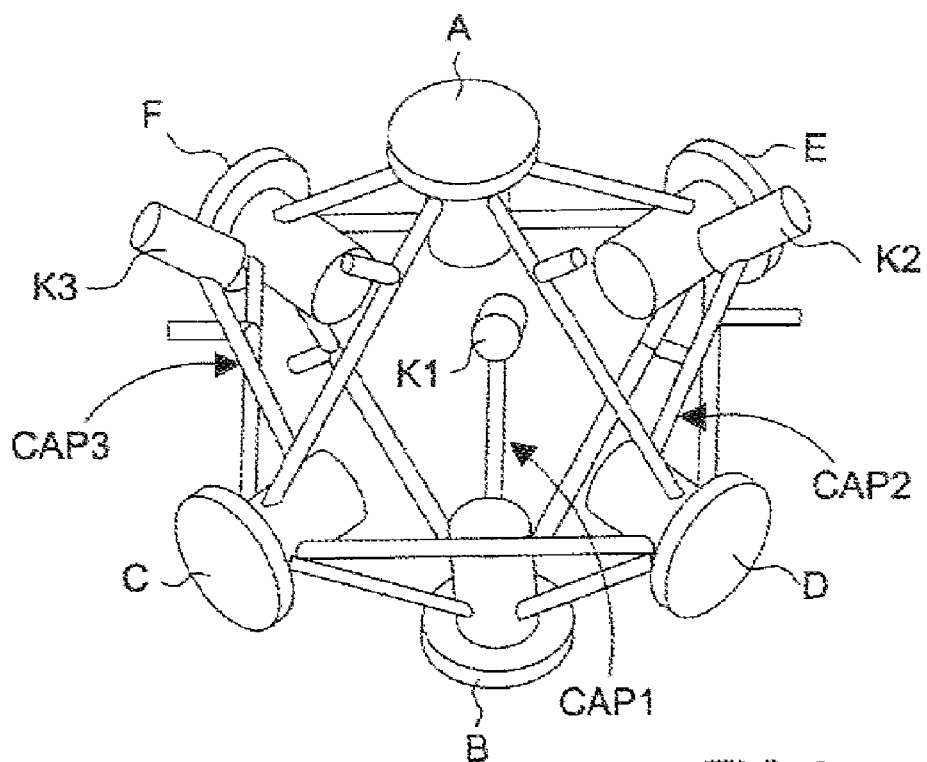
FIGS. 3 and 4 are perspective views of an optical block of a gyro according to the invention from different viewing angles, FIG. 4 showing in more detail the gas reserve associated with one of the mirrors.
Figure 4:
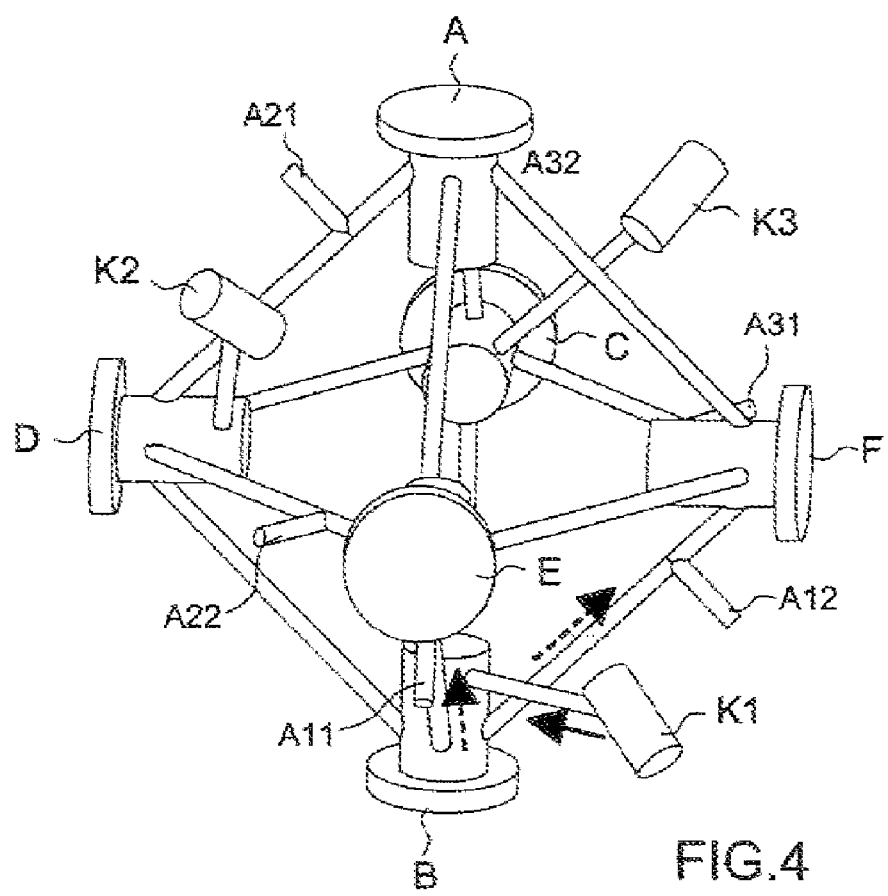

In the inventive gyro with optical block with three cathodes, each cathode (K1 to K3) is linked by a capillary (CAP1 to CAP3 respectively) to one of the three gas reserves associated with the mirrors B, C, D as shown in FIGS. 3 and 4. From each gas reserve, as in the gyro of the prior art, two capillaries leave towards two anodes. Thus, as shown in FIG. 4, the cathode K1 supplies the plasmas of the anodes A11 and A12. Similarly, the cathode K2 supplies A21 and A22 and the cathode K3 supplies A31 and A32. These parts with plasma, between reserve and anodes, are used to provide the gain of the laser.

The axis of each cathode is preferably placed on one of the trisectrices of the block. The fourth trisectrix corresponds to the activation axis. This configuration makes it possible to keep the symmetry of rotation at 120° from the optical block of the gyro.

It will be seen that in the inventive device, each cathode now only has to supply current to two anodes. Hence a factor of 3 on the current density required of the cathode. The experimental cathode ageing laws being of the form:

$$\text{Life} = k j^{-n}$$

with: j=cathode current density and n: between 2.5 and 3 it can easily be calculated that the expected gain on the life is of the order of 20, and this, naturally, in the case where the triaxial gyro with three cathodes keeps the same cathode geometry as the single-cathode gyro of the prior art.

With respect to the performance levels in terms of False Zero (also called bias), sensitivity to thermal drifts and to the power-up process of each cavity, it will be noted that the entire block remains with a symmetry of 120° with, for axis of symmetry, the axis on which the activation axis is placed. The configuration with three cathodes keeps the following properties:

Use of two anodes for each cavity, the six anodes being able to be placed every 60°, Anodes in the plane of each cavity, Symmetry of localized heating of the cathodes relative to the activation axis.

The result is that the performance characteristics linked to the temperature and the geometrical symmetry of the capillaries are retained.

There now follows a description of an electronic device for the ignition of a triaxial gyro with three cathodes and the associated current regulation circuits.

In the operation of the laser gyro, it is important to make the plasma discharges symmetrical in terms of operating current so as to reduce the False Zero instabilities. This function is achieved by controlling the ignition sequence in order for all of the discharge arms to be correctly ignited, and then by current regulation for all the arms to have the same operating current.

Figure 5:
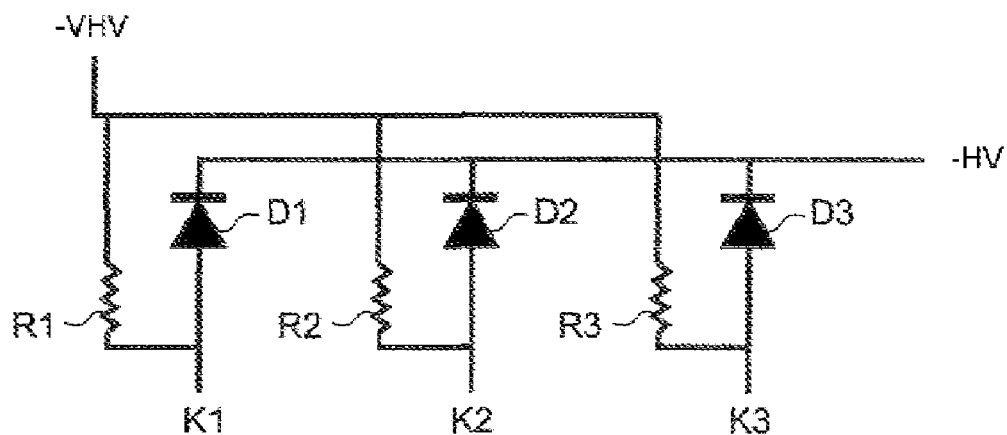
FIG. 5 is a diagram of an exemplary electrical power supply circuit for the optical block of the inventive gyro.

In the exemplary embodiment of FIG. 5, the ignition of the gyro is achieved by applying to each cathode a voltage of a value of a few kV (typically 3 kV to 5 kV) while the gyro is off. After ignition, the value of the cathode voltage is reduced to a holding value of a few 100 V (typically between 500 and 900 V). This symmetrical ignition circuit uses a single high voltage power supply (HV) associated with a single very high voltage power supply (VHV). The voltages are then distributed to the cathodes by a network of resistors and diodes. Each cathode is linked to the HV by a diode (D1 to D3) which serves as a switch, and is also linked to the VHV by a high-value resistor (R1 to R3) which makes it possible to superimpose the VHV on the HV as long as the cathode is not drawing current. A typical resistance value for applying the VHV is 100 MΩ.

The value of the resistor used depends on the VHV generation. If the latter is achieved by an impulse transformer, the value of the resistor depends on the impulse refresh frequency. It is in fact essential for the VHV to remain sufficient (of the order of a few kV) until the ignition of the arms linked to the last ignited cathode, even when one of the cathodes is ignited before the others.

Such an ignition circuit configuration remains valid with the use of three impulse transformers each linked to a cathode by an R-C network or, with the use of a continuous VHV power supply. These circuits make it possible to reduce the resistors to lower values (a few 100 KΩ).

Figure 7:
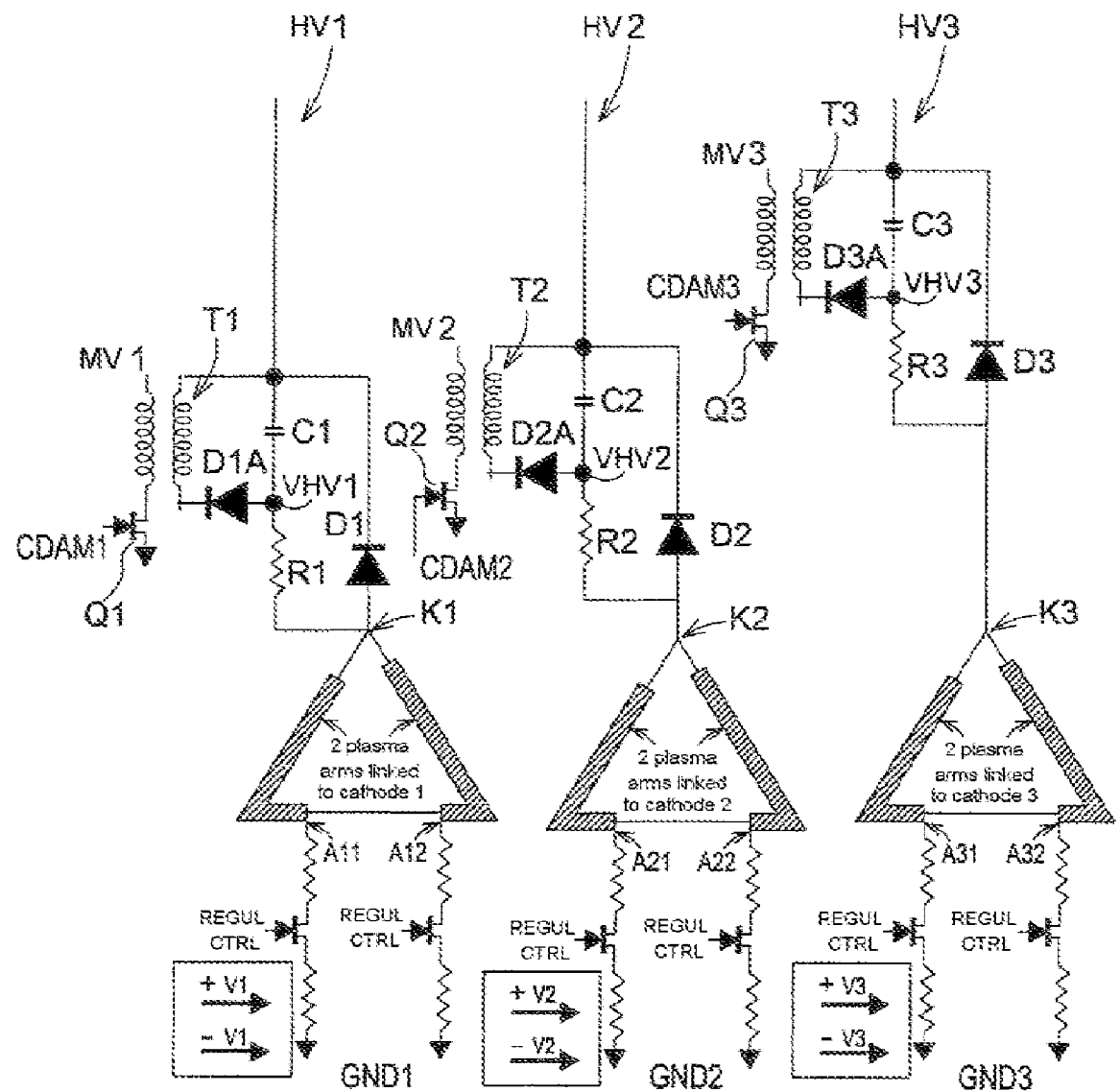
FIG. 7 is a diagram of another exemplary electrical power supply circuit for the optical block of the inventive gyro.

Another configuration can also consist in using three "HV+VHV" power supplies with electrical insulation between them. FIG. 7 shows one exemplary embodiment of such a circuit. This circuit comprises, for each cathode K1 to K3, an impulse transformer (T1 to T3), the secondary of which supplies high voltage (HV1 to HV3) and very high voltage (VHV1 to VHV3) to this cathode. The impulse generating the very high voltage is sent to the primary of each transformer (T1 to T3), by a control transistor (Q1 to Q3) driven in pulse mode via the controls (CDAM1 to CDAM3). The primary of each of these transformers is also supplied by a medium voltage (MV1 to MV3), between 100 and 300 V approximately. On the secondary of each transformer, the very high voltage is rectified and filtered by the networks (D1A, C1) to (D3A, C3). The voltages are then distributed to each cathode by a network of resistors and diodes, comprising the elements D1 to D3 and R1 to R3. Each cathode (K1 to K3) is linked to the HV by a diode (D1 to D3) which serves as a switch, and is also linked to the VHV by a resistor (R1 to R3) of high value (between 3 and 10 MΩ approximately) which makes it possible to superimpose the VHV on the HV as long as the cathode is not drawing current. To complement the assembly, the current regulation power supplies (applied to the respective primaries of T1 to T3) are also electrically insulated from the high and very high voltages (applied to the respective secondaries of T1 to T3). The cold points (0 volt) of the low voltage power supplies (±V1 to ±V3) are linked respectively to the cold points of the high voltage power supplies (HV1 to HV3). In this way, any risk of bridging between anodes is avoided.

In the gyros of the prior art, the checking of the correct ignition was triggered immediately one of the discharges was initialized (that is, the existence of a plasma current for at least one anode).

Figure 6:
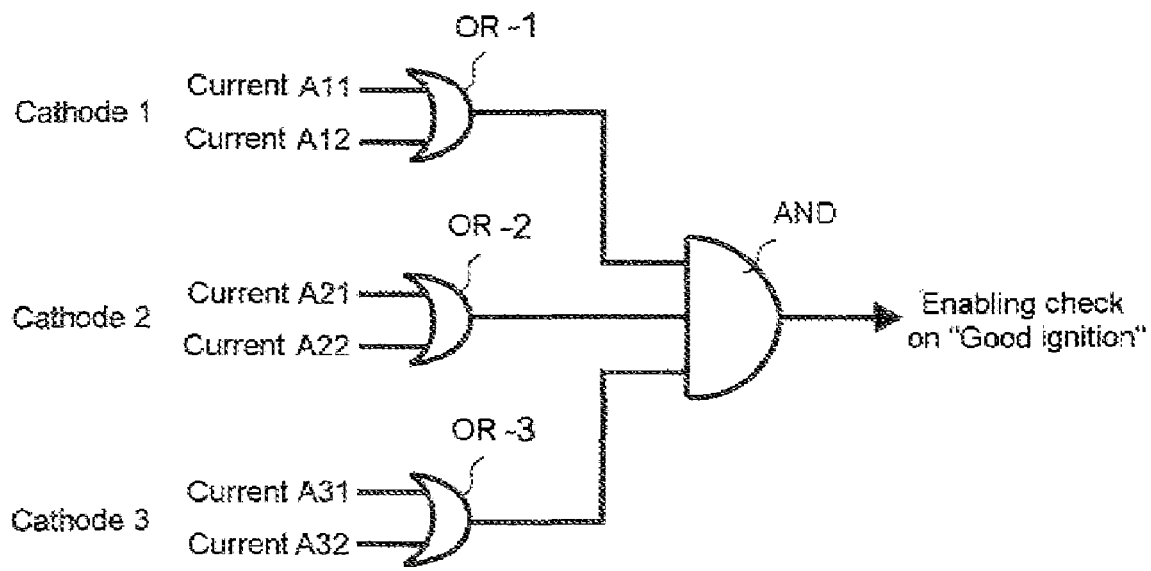
FIG. 6 is a diagram of one exemplary circuit for enabling good ignition for the inventive gyro to be checked.

For the application to the gyro with three cathodes, the invention takes account of the fact that at least one arm of each cathode is ignited before the correct ignition is checked. FIG. 6 shows an exemplary circuit making it possible to check the establishing of the currents between each of the three cathodes and at least one of the two anodes relative to these cathodes. To this end, six current sensors (not shown in the drawing) are disposed in the corresponding arms of the six anodes starting from the three cathodes. The signal outputs (current present or absent) of these sensors, taken in pairs for each of the corresponding cathodes, are linked to the inputs of three logical OR circuits (referenced OR-1 to OR-3), the outputs of which are linked to an AND circuit. The output of this AND circuit supplies a signal enabling the correct ignition to be checked.

This other characteristic of the invention makes it possible to reset the ignition configuration of the cathodes to zero on each ignition. In effect, on an incomplete ignition on the six arms (for example untimely ignition on the rising edge of the HV), on the next attempt, different cathode-level plasma and electronic configurations are avoided. In practice, the response time of the cathode is dependent, among other effects, on the idle state of the plasma and therefore on the off-time seen by the gyro since the last ignited state.

The invention claimed is:

1. A laser gyro, comprising:
   an optical block having three communicating resonant optical cavities which form a regular octahedron having eight triangular sides, each of the cavities presenting four capillary segments forming a square perpendicular to a corresponding sensitive axis, these cavities being arranged so that each of the angles of one cavity coincides and communicates with the angle of another cavity, a mirror associated with each pair of coinciding angles being oriented so as to be used by the two cavities forming said pair, each cavity using four mirrors of which two are transmissive, one of them being a reading mirror, and the other two being cavity-length servo mirrors, said gyro further comprising an activation mechanism for driving the block according to a reciprocating rotation movement about an activation axis, wherein the gyro comprises three cathodes each linked to two cavities out of the three, these two cavities being each time taken by circular permutation.

2. The gyro according to claim 1, wherein each cathode is linked by a capillary to a gas reserve associated with a mirror, this reserve being in turn linked to two cavity capillary segments belonging to two different cavities.

3. The gyro according to claim 1, wherein its ignition comprises a high voltage power supply and a very high voltage power supply, these two power supplies being decoupled from each other by a resistor and a diode.

4. The gyro according to claim 1, wherein its ignition comprises, for each cathode, a high voltage power supply and a very high voltage power supply, the power supplies of each cathode and the power supplies of their respective current regulations being electrically insulated from each other.

* * * * *